Patented Dec. 21, 1943

2,337,508

UNITED STATES PATENT OFFICE 2,337,508

PLASTIC COMPOSITION

John S. Tinsley, Wilmington, Del., assignor to Hercules Powder Company, Wilmington, Del., a corporation of Delaware No Drawing. Application May 18, 1942, Serial No. 443,463

5 Claims. (Cl. 106—187)

This invention relates to the stabilization of cellulose ethers and more particularly to the production of cellulose ether compositions which retain their color after exposure to heat, ultra-violet light, or outdoor weathering.

Cellulose ether compositions have been used in a variety of applications such as films, foils, sheets, coating compounds, fabrics, filaments, and numerous molded articles such as combs, buttons, tableware, brushes, radio parts, etc. The compositions of cellulose ethers have been subjected to injection and compression molding operations and extrusion.

It is important that the cellulose ether composition should not develop undesirable coloring during molding operations where it is subjected to high temperatures.

Cellulose ether compositions have been made up into thin sheets as a wrapping material, adhesive tape, etc. and in heavier sheets which have been used for flexible windows, paneling, etc. Resistance to the degrading effects of heat, ultra-violet light, or outdoor weathering for these sheets is very important and it is particularly desirable to avoid development of undesirable color during the exposure.

Now, in accordance with the present invention the color stability to heat, ultra-violet light, and outdoor weathering of cellulose ether compositions has been accomplished by the addition of a small amount of isophorone. Isophorone is believed to have the following formula:

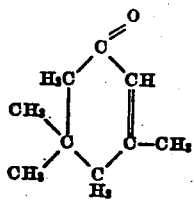

which may be designated as, 3,5,5-trimethyl cyclohexene 2-one-1.

The isophorone is effective in very small proportions. It is not necessary to use more than about 3% of the weight of the cellulose ether present. Preferably, the isophorone is used in amounts equivalent to 1% of the cellulose ether. Amounts substantially less than 1% have a lesser color stabilizing effect.

To illustrate the advantages of the invention, the following example is given:

Example

A film was made up of 40 parts of ethyl cellulose with an ethoxyl content within the range of 44.5% to 49.0%, 3 parts of methyl phthalyl ethyl glycollate, 2 parts of dibutylphthalate, 5 parts glyceryl ester of hydrogenated rosin, 1.75 parts Japan wax, and equivalent portions of film were subjected to ultra-violet light, heat, and outdoor weathering. Another film was made up of the same ingredients but with the addition of 1% isophorone based on the ethyl cellulose. After exposure to heat of about 120° C. for 48 hours the film containing the isophorone showed no discoloration while the blank was moderately discolored. Upon exposure to ultra-violet light for 50 hours the film containing isophorone showed no discoloration while the blank was somewhat discolored. On exposure to outdoor weathering conditions for 117 days the film containing isophorone showed no discoloration while the blank was somewhat discolored.

While the above example has disclosed ethyl cellulose, the invention is applicable to the other cellulose ethers such as for example: Ethyl butyl cellulose, ethyl propyl cellulose, etc. The ethoxyl content and the viscosity of the ethyl cellulose may vary within the ranges commercially available although the type having an ethoxyl content between 44 and 50% is most generally useful.

The plasticizers used are those used commercially with cellulose ethers such as tricresylphosphate, dimethylphthalate, dibutylphthalate, vegetable oil fatty acids, etc. Plasticizers, compatible resins, filler, pigments, and coloring matter may be added to the compositions.

The isophorone is added to the cellulose ether composition during the compounding and becomes thoroughly dispersed during the mixing operations. While the addition of the compound before or during the mixing operation is most practical, other methods are within the contemplation of this invention.

Thus, according to the present invention isophorone was found to be a very effective heat, ultra-violet light, and outdoor weathering color stabilizer for cellulose ether compositions.

What I claim and desire to protect by Letters Patent is:

1. A plastic composition comprising a cellulose ether and isophorone as a color stabilizer therefor.

2. A plastic composition comprising ethyl cellulose and isophorone as a color stabilizer therefor.

3. A plastic composition comprising a cellulose ether and between about 1% and about 3% of isophorone as a color stabilizer therefor.

4. A plastic composition comprising a cellulose ether and about 1% of isophorone as a color stabilizer therefor.

5. A plastic composition comprising ethyl cellulose and about 1% of isophorone as a color stabilizer therefor.

JOHN S. TINSLEY.